UNITED STATES PATENT OFFICE.

HENRY MOWER, OF CAMDEN, ASSIGNOR OF ONE-HALF HIS RIGHT TO MILES BLODGETT, OF SANDY CREEK, NEW YORK.

IMPROVEMENT IN COMPOUNDS FOR UNHAIRING HIDES AND SKINS

Specification forming part of Letters Patent No. 158,648, dated January 12, 1875; application filed April 17, 1874.

*To all whom it may concern:*

Be it known that I, HENRY MOWER, of Camden, county of Oneida and State of New York, have invented certain new and useful Improvements in Compound for Unhairing Hides and Skins and Pulling Wool, of which the following is a specification:

The nature of my invention consists in an improved compound for "liming" and unhairing hides, skins, and for pulling wool; and consists of quicklime, lye from ashes or potash, sulphuric acid, and sulphuret of iron, as will be hereinafter more fully set forth.

A compound is prepared in the following manner: Slake one pound of quicklime by the use of four quarts of water in a pail, to be as thick as good whitewash. Take a bottle that will hold one pint or more, clear white glass being the best. Have a half-inch lead pipe twelve to fifteen inches long, and fit one end air-tight in the mouth of the bottle. Bend this pipe so that the other end will enter the lime in the pail, one or two inches below the surface of the lime. Place four ounces of sulphuret of iron into the bottle, and cover the same well with water. Add sulphuric acid sufficient to cause the contents to boil. Then fasten the lead tube in the bottle, and let the other end into the lime, as above stated. The sulphuric acid, when in contact with water and sulphuret of iron, will generate a gas, which is conveyed through the tube to the lime and colors the lime blue. The lime being an absorbent, the gas unites with the flour of lime. This operation should be performed in the open air, as it has a disagreeable odor. When the action in the bottle ceases and the contents become dry, add water and sulphuric acid, as at first; but should any water remain in the bottle after the action ceases, pour off the water and add water and sulphuric acid, as above, and continue the operation until the sulphuret of iron is all consumed. The lime is stirred occasionally, so as to mix the gas through the lime.

In order to test the strength of the thus-prepared lime, if sufficiently charged with the gas it will, if a small quantity be put on the arm, remove the hair, if any, in five or six minutes, causing no pain or doing no harm to the skin.

One gallon of the above-prepared lime will be sufficient to strengthen from five to six gallons of lime prepared after the common mode for liming hides.

The above proportions may be followed for preparing any quantity required.

To prepare large quantities of the prepared lime, for one barrel slake thirty-two pounds of quicklime by adding one gallon of hot water to each pound of lime.

As there is a difference in the quality of lime, the operator will have to use his judgment in preparing it to do the work intended.

Hides in my process of liming should be handled often; or the best way is to have two limes prepared in adjoining vats and handle from one vat to the other once an hour for four to six hours, and occasionally after, as this process works rapidly, and by being handled often will lime more uniform. The foregoing exhibits the state of the art.

For harness, upper, and calf-skins add lye sufficient to give a slippery feeling to the lime as follows: For a pack of one hundred and fifty sides of upper-leather, harness, or calf-skins add lye from ashes or potash dissolved in water, from ten to fifteen gallons. Renew the lime by adding of the prepared lime from three to six gallons for every new pack to be limed, which will keep the lime in good working condition. This process, as specified, will lime sole-leather hides in from ten to twenty-four hours, harness and upper leather hides in from six to fifteen hours, calf-skins in from three to six hours. All depends on the strength of the lime and being properly handled.

Sole-leather hides, when unhaired, are to be rinsed in cold water, when they are ready for the tanning process. Harness and upper leather and skins, when unhaired, are to be immersed in clear water and worked on the flesh side. When worked they are to be put in a vat of clean warm water and allowed to remain therein for a short time, and then the grain side worked, when they will be ready for the tanning process.

To pull wool, spread the flesh side up and apply a thin coating of the prepared lime with a brush. In about one hour the wool will come off easy, after which the skin is immersed in water the same as calf-skins and both sides worked, ready for the tanning process.

In the old method of liming the hides become so impregnated with lime that much bathing and labor are required to reduce them sufficient to make good leather; but in my process the hides rise rapidly and remain soft without this bathing and excessive labor.

Lime, though an insoluble ingredient, cannot be dispensed with, as it is an absorbent, uniting with the gas generated by the action of the sulphuric acid, sulphuret of iron, and water. Lye, being a soluble alkali, penetrates, cleanses, and softens, in connection with lime in removing the hair, and will readily wash out with water, as specified. Sulphur is very penetrating and softening. Iron is important in connection with sulphur in making sulphuret of iron and making gas. Sulphuric acid in this process is an important ingredient in preparing hides for the tanning process, and in connection with the sulphuret of iron in making gas.

The above ingredients, prepared as specified, prepare hides perfectly for tanning, and do not destroy the gelatine in the hide—simply dissolves the roots of the hair, and the hide retains all its weight and strength.

This preparation is especially adapted for dry hides, as the ingredients, except lime, have softening qualities, which overpower the lime and raise and plump the hides, so that they will be and remain soft and pliable.

By my preparation the cost of preparing the hides for tanning is materially reduced, and considerable time and labor saved; and the tanning process will, if the hides have previously been prepared by my process, take one-third less time, and will produce leather of better weight, color, and quality.

Having thus fully described my invention, what I claim as new, and desire to secure by Letters Patent, is—

The combination of lye from wood-ashes or potash and lime which has been treated by the gas generated by sulphuric acid, sulphuret of iron, and water, substantially in the manner and for the purposes herein set forth.

In testimony that I claim the foregoing as my invention I hereunto affix my signature this 15th day of April, 1874.

HENRY MOWER.

Witnesses:
JOSIAH S. WRIGHT,
JOHN CRAIG.